United States Patent
Kato (10) Patent No.: US 6,591,159 B2
(45) Date of Patent: Jul. 8, 2003

(54) METHOD OF MAKING TOOL PATH (75) Inventor: Noriyuki Kato, Aichi-Perfecture (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 10/127,328

(22) Filed: Apr. 22, 2002

(65) Prior Publication Data
US 2002/0161471 A1 Oct. 31, 2002

(30) Foreign Application Priority Data
Apr. 26, 2001 (JP) ........................................ 2001-130129

(51) Int. Cl.$^7$ ............................................... G06F 19/00
(52) U.S. Cl. ...................... 700/187; 700/186; 700/159; 318/567
(58) Field of Search ................................. 700/186, 187, 700/159, 174, 117, 56–66; 318/567

(56) References Cited

U.S. PATENT DOCUMENTS 5,235,959 A * 8/1993 Frank et al. .............. 125/11.01
5,515,290 A * 5/1996 Honda ......................... 700/187
6,205,371 B1 * 3/2001 Wolter-Doll ................ 700/174

* cited by examiner

Primary Examiner—Jayprakash N. Gandhi
(74) Attorney, Agent, or Firm—Burr & Brown (57) ABSTRACT A method of making a tool path, wherein a shape to which an object surface is to be processed and processing conditions are inputted, and a processing region is designated on the processing region, and a tool path on the processing region is calculated on the basis of the reference lines. When the number of the processing region is one, a tool escaping expansion region is added to a terminal end in the picking direction of the processing region, or a tool approaching expansion region is added to a starting end in the picking direction of the processing region. When the number of the processing regions is not smaller than two, a tool escaping expansion region is added to a final end in the picking direction of the processing region precedingly, and a tool approaching expansion region to a starting end in the picking direction of the processing region posteriorly.

4 Claims, 7 Drawing Sheets

METHOD OF MAKING TOOL PATH

BACKGROUND OF THE INVENTION

This application claims the benefit of Japanese Application Number 2001-130129 filed Apr. 26, 2001, the entirety of which is incorporated herein by reference.

1. Field of the Invention

This invention relates to a method of making a tool path by using a CAM in a machine tool.

2. Description of the Related Art

Figure 7:
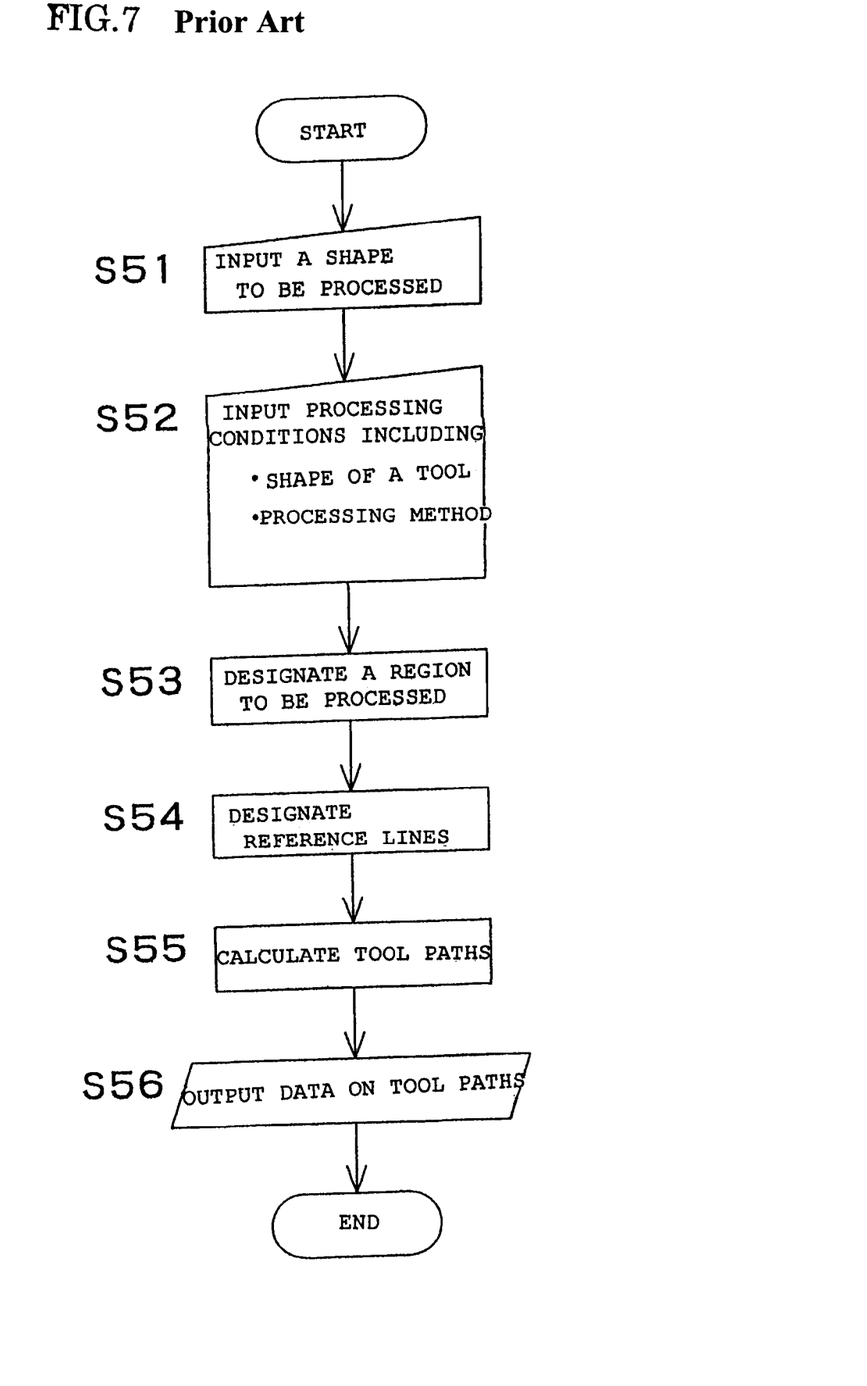
FIG. 7 is a flow chart showing a related art method of making a tool path.

A method of making a tool path shown in FIG. 7 has heretofore been known. In a step S51, two-dimensional and three-dimensional shapes to which a work is to be processed are inputted. In a step S52, processing conditions, such as a tool shape and processing methods are inputted. The processing methods include the contour line processing and the scanning line processing. In a step S53, a processing region (i.e. region to be processed) is designated on a surface to be processed with the shape to which the work is to be processed and processing conditions taken into consideration. In a step S54, reference lines are designated on the processing region. In a step S55, a tool path in the processing region is computed on the basis of the input information and reference lines. In a step S56, the data on the tool path are outputted.

Figure 8:
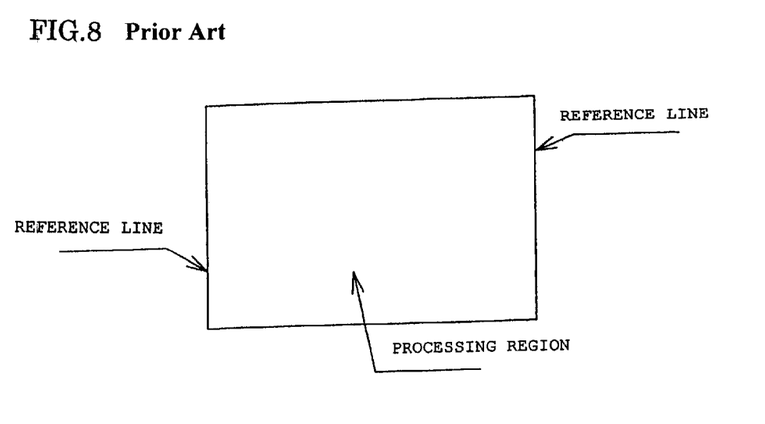
FIG. 8 is a schematic diagram showing reference lines of a processing region.
Figure 9:
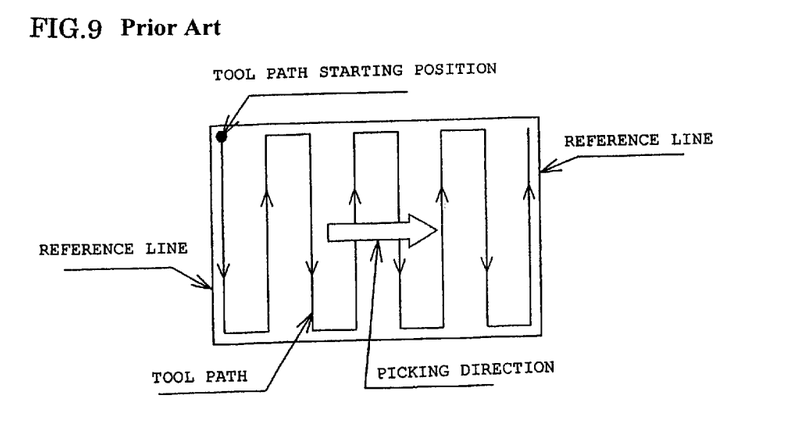
FIG. 9 is a schematic diagram showing a tool path with reference lines formed of straight lines.
Figure 10:
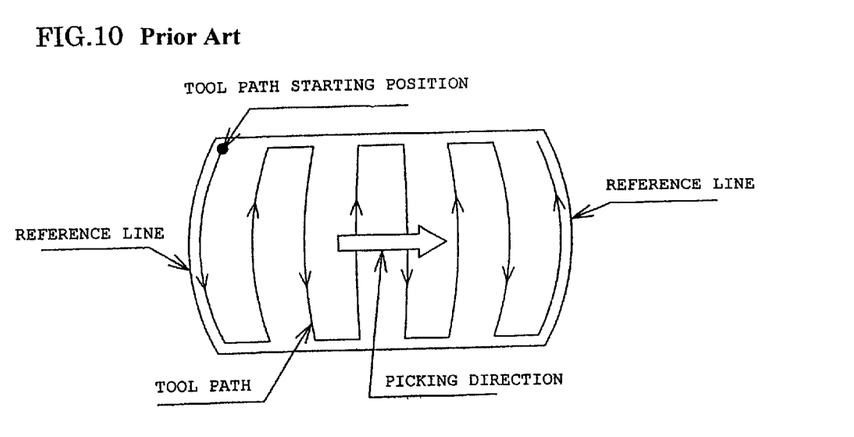
FIG. 10 is a schematic diagram showing a tool path with reference lines formed of curves.

When such a processing region as is shown in FIG. 8 is designated, reference lines are usually designated at both edges of the processing region. As shown in FIG. 9, when the reference lines are straight lines, a tool path is a straight line parallel to the reference lines, and computed plurally in the direction (which will hereinafter be referred to as picking direction) which is perpendicular to the reference lines. When the reference lines are curves, the tool path is a curve obtained by gradually increasing the curvature of the reference lines, and computed plurally in the picking direction which is at right angles to tangents of the reference lines as shown in FIG. 10.

Figure 11:
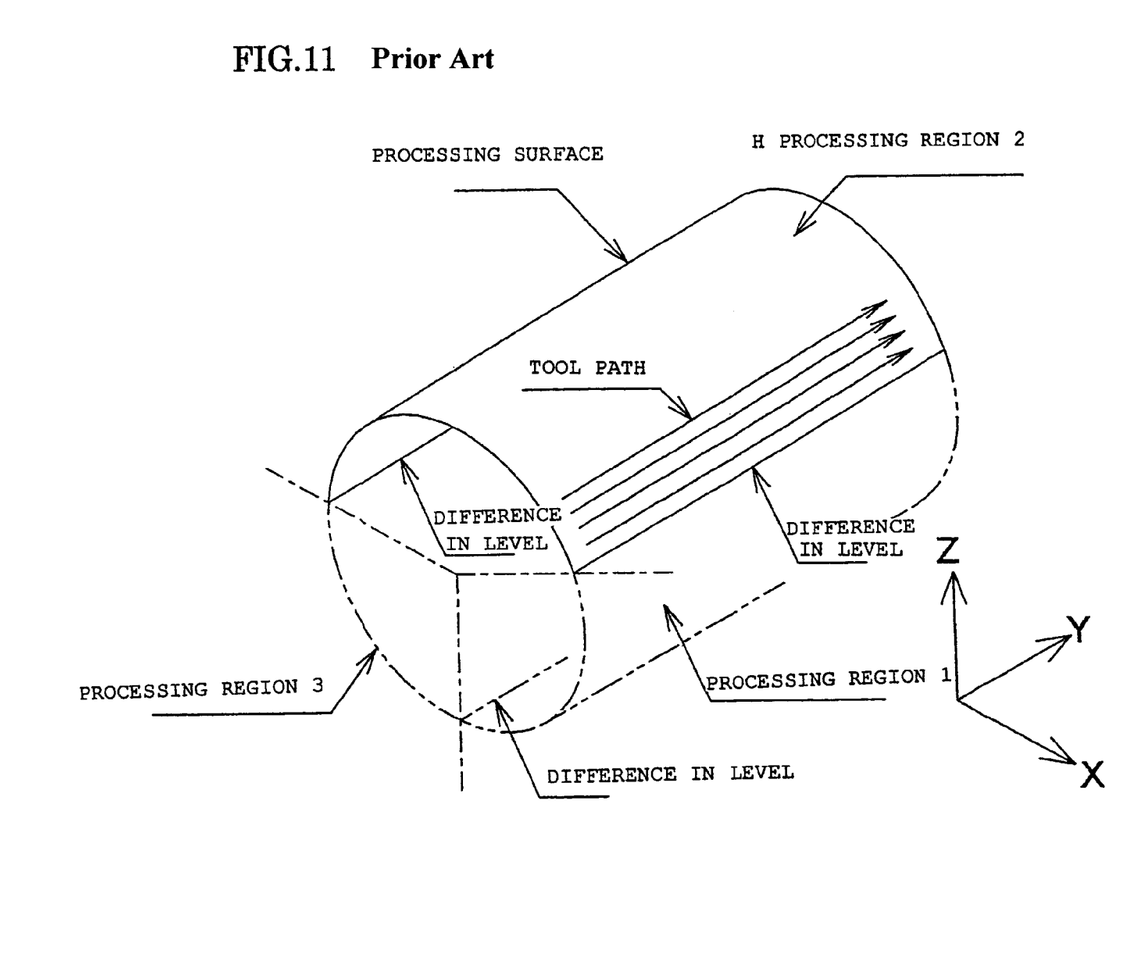
FIG. 11 is a schematic diagram pointing out problems encountered in a related art method of this kind.

When a work is processed by using the data on a tool path made by a related art method of this kind, a difference in level of a processed surface occurs at a starting end or a terminal end of a processing region. For example, when a cylindrical surface to be processed is divided into a plurality of parts, which are then processed by scanning lines (moving a tool in parallel with the Y-axis) as shown in FIG. 11, differences in level remain in boundary portions of processing regions 1, 2, 3. The causes of the occurrence of such differences in level include the wear on the tool, thermal expansion of the tool or work, and a correction error of a tool length which occurs while the regions are processed. When a flat surface to be processed is divided into parts, differences in level also remain in boundary portions of a processing region, in the same manner as in a case where a curved surface is processed.

SUMMARY OF THE INVENTION

The present invention has been made in view of these circumstances, and provides a method of making a tool path, capable of making inconspicuous the differences in level of boundary portions of processed regions, and obtaining a smooth processed surface.

A first aspect of the invention provides a method of making a tool path, including the steps of designating processing regions on a surface to be processed, designating reference lines on the processing regions, calculating on the basis of the reference lines a plurality of tool paths on the processing regions, selecting at least one of the adding of a tool approaching expansion region of which a distance measured from the surface to be processed) becomes larger as the expansion region gets away from the processing region to a starting end in the picking direction of the processing region, or the adding of a tool escaping expansion region of which a distance measured from the surface to be processed becomes larger as this expansion region gets away from the processing region to a terminal end in the picking direction of the processing region, and calculating the tool path within the expansion region.

A second aspect of the invention also provides a method of making a tool path, including the steps of dividing a surface to be processed into parts and designating a plurality of processing regions, designating reference lines on the processing regions, calculating on the basis of the reference lines a plurality of tool paths in each of the processing regions, adding a tool approaching expansion region of which a distance measured from the surface to be processed becomes larger as the expansion region gets away from the processing region to a starting end in the picking direction of a processing region which agrees with a boundary line of two adjacent processing regions, adding a tool escaping expansion region of which a distance measured from the surface to be processed becomes larger as this expansion region gets away from the processing region to a terminal end in the picking direction of the processing region which agrees with a boundary line of two adjacent processing regions, and calculating tool paths in each expansion region.

A third aspect of the invention further provides a method of making a tool path in accordance with the first or second aspect invention above, in which the expansion regions are tangential curved surfaces including boundary lines between the expansion regions and the processing region and contacting the surface to be processed, the radius of the tangential curved surfaces being set not smaller than an expansion amount of the tangential curved surfaces.

DESCRIPTION OF THE PREFERRED EMBODIMENTS

Figure 1:
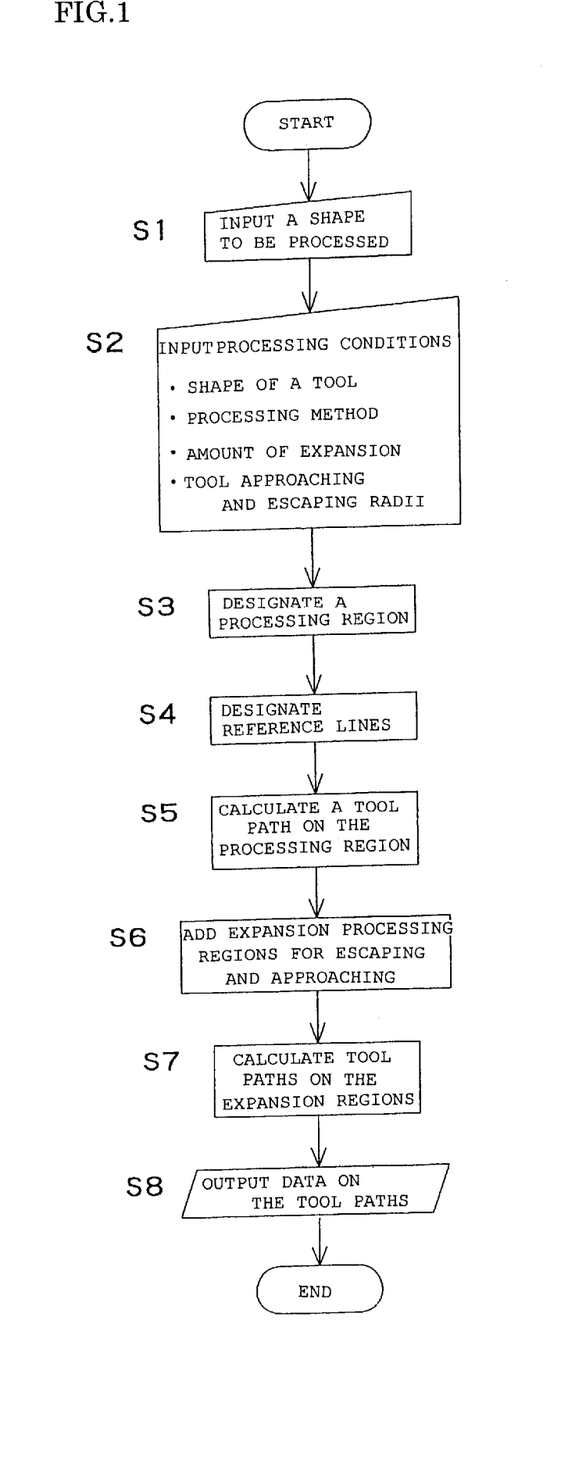
FIG. 1 is a flow chart of a method of making a tool path, showing a mode of embodiment of the present invention.

The modes of embodiment of the present invention will now be described on the basis of the drawings. FIG. 1 is a flow chart showing a method of making a tool path for a machine tool using a CAM. First, in steps S1 to S5, a shape to which a work is to be processed is inputted, and then the processing conditions, a processing region being designated on the surface to be processed, in the same manner as in a related art method of this kind. Reference lines are designated on both edges of the processing region, and a tool path in the processing region is calculated on the basis of the reference lines.

Figure 2:
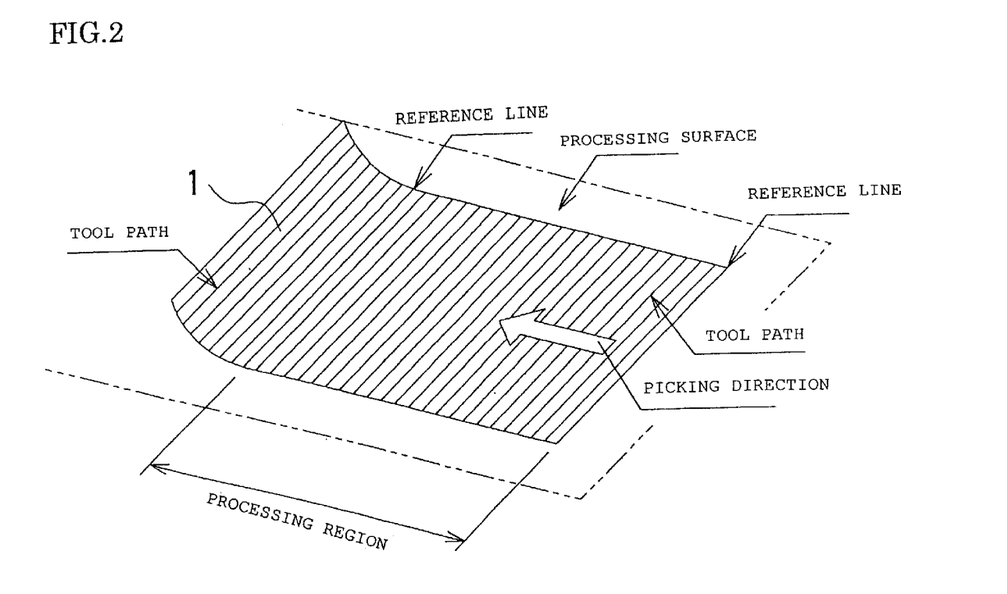
FIG. 2 is a schematic diagram showing an example of the making of a tool path by the method of FIG. 1.
Figure 3:
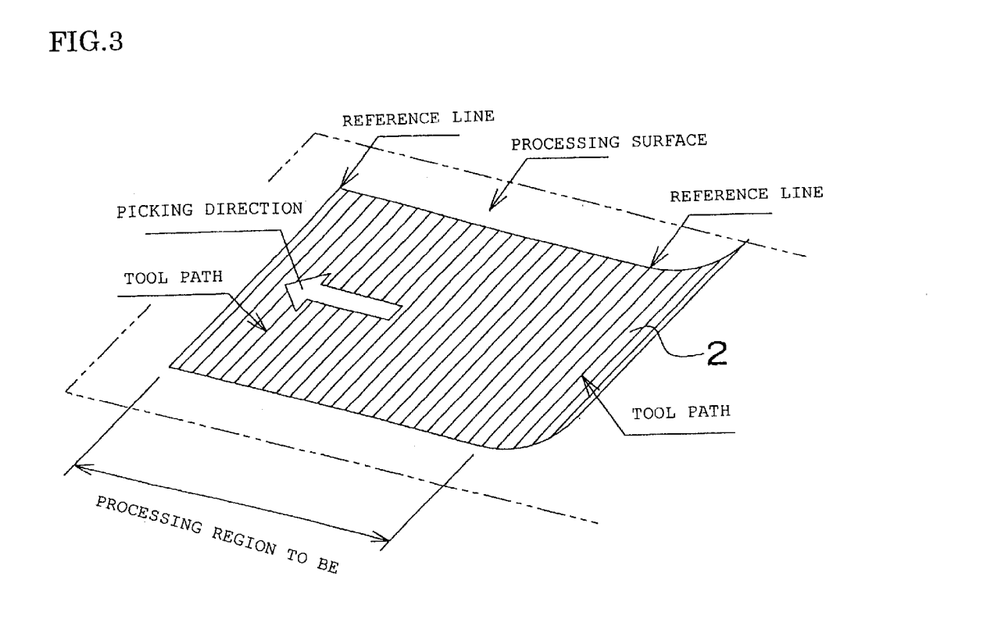
FIG. 3 is a schematic diagram showing another example of the making of a tool path by the method of FIG. 1.

Next, in a step S6, a tool escaping or tool approaching expansion region is added to the processing region. When the number of the processing region in this embodiment is one, a tool escaping expansion region 1 is added to a terminal end in the picking direction of the processing region, as shown in FIG. 2, or a tool approaching expansion region 2 is added to a starting end in the picking direction of the processing region, as shown in FIG. 3. One expansion region, which is to be added out of these two expansion regions, is determined in accordance with the shape to which the work is to be formed.

Figure 4:
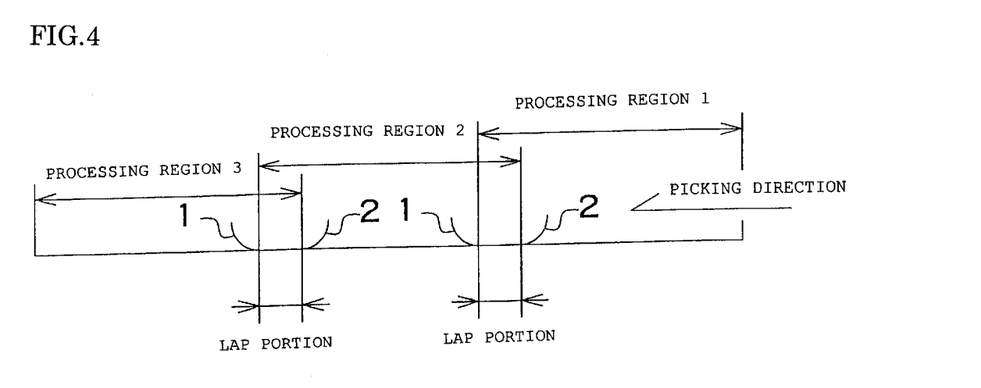
FIG. 4 is a schematic diagram showing still another example of the making of a tool path by the method of FIG. 1.
Figure 5:
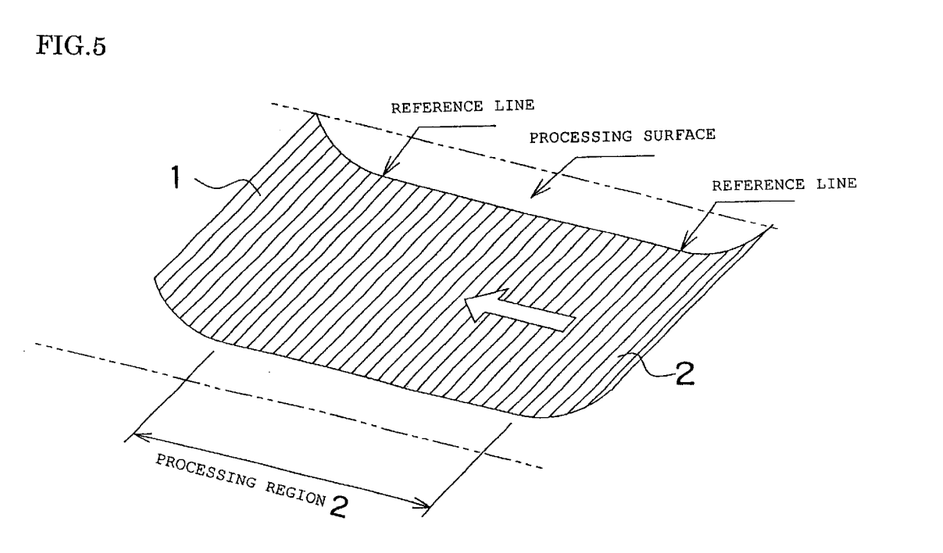
FIG. 5 is a schematic diagram showing the tool path of FIG. 4.

When the surface to be processed is divided into parts with a plurality of processing regions designated, a tool escaping expansion region 1 is added as shown in FIG. 4 to a terminal end in the picking direction of a processing region precedingly out of two adjacent processing regions. Then a tool approaching expansion region 2 is added to a starting end in the picking direction of a processing region. In this case, in a processing region positioned intermediately (processing region 2 in FIG. 4) has a tool escaping expansion region 1 and a tool approaching expansion region 2 added to both ends thereof, as shown in FIG. 5.

Figure 6:
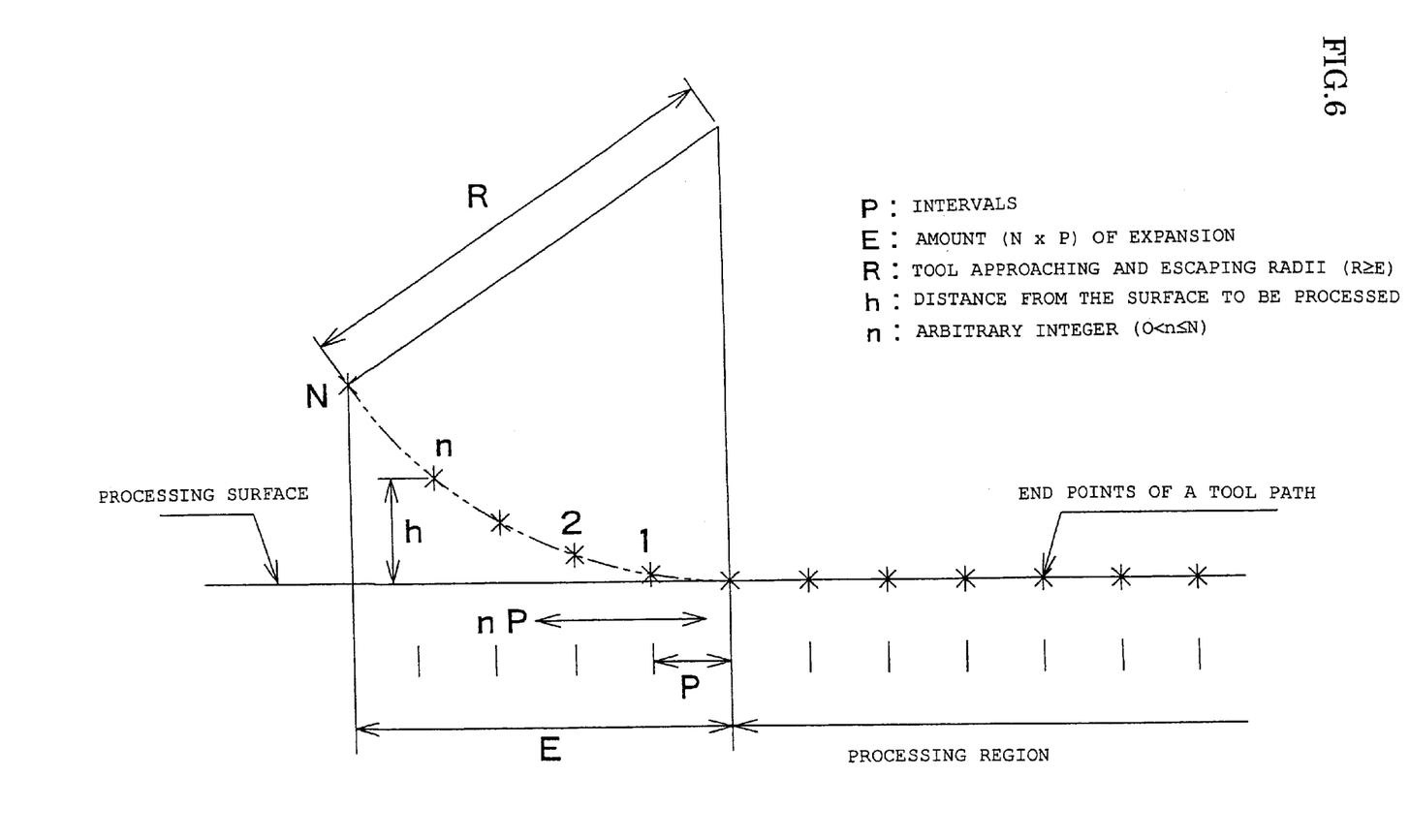
FIG. 6 is a schematic diagram illustrating a method of calculating a tool path in an expanded region.

These expansion regions 1, 2 are tangential curved surfaces contacting the surface to be processed, and including boundary lines between the expansion regions and a processing region, i.e. reference lines. In order to designate the expansion regions 1, 2, an expansion amount E of the tangential curved surface and radii (i.e. tool approaching and escaping radii R), which are defined in FIG. 6, are included in the conditions and inputted in the above-mentioned step S2. It is preferable that the tool approaching and escaping radii be set higher ($R \geq E$) than the expansion amount so that the expansion regions 1, 2 smoothly separate from the surface to be processed.

Next, in a step S7, tool paths included in the added expansion regions 1, 2 are calculated on the basis of the reference lines. In this embodiment, the tool paths are calculated so that an amount (h) of separation thereof from the surface to be processed increases as the tool paths get away from the processing regions. To be concrete, provisional tool paths are calculated by making the calculation identical with that made to determine the processing region. Next, the tool paths are calculated by parallel transferring the provisional tool paths in the direction (positive direction of a Z-axis) in which the tool paths get away from the surface to be processed by the following h every time the tool paths get away by a predetermined distance (P) from the reference lines of the processing region.

$h = R - \{R^2 - (nP)^2\}^{1/2}$ wherein n is an arbitrary integer ($0 < n \leq N$).

The amount E of expansion is ($E = NP$).

Next, in a step S8, the tool paths in the expansion regions 1, 2 are added to that of the processing region, and data on such a group of tool paths are outputted. When there is a plurality of processing regions, it is preferable that a small range of lap portion be designated in a position adjacent to each processing region, as shown in FIG. 4. When such lap portions are designated, the expansion regions get away smoothly from the surface to be processed in a position beyond the reference lines of the processing regions. Therefore, a boundary portion between adjacent regions can be processed smoothly without causing a difference in level to occur.

The present invention is not limited to the above-described modes of embodiment. The invention can also be practiced by suitably changing the shape and construction of each part within the scope not departing from the gist of the invention.

(1) The reference lines are designated by setting the same lines in agreement with a centerline of a processing region.

(2) The above-mentioned method is applied to such a cylindrical surface as is shown in FIG. 11 and a surface to be processed which is formed of some other curved surface.

(3) The above-mentioned method is applied to a contour line processing operation.

(4) The method is applied to two adjacent processing regions the picking directions of which are different from each other.

(5) A surface to be processed is divided into parts, and a plurality of processing regions is designated automatically by calculation in the midst of the formation of a processing path.

According to the invention described in claim 1, a tool path smoothly approaches a surface being processed in a tool approaching expansion region, while the tool path smoothly gets away from the surface being processed in a tool escaping expansion region. Therefore, the invention has an effect of making a difference in level inconspicuous on the starting end or terminal end of the processed region.

According to the invention describe in claim 2 above, a tool path smoothly approaches or gets away from a surface being processed in a tool approaching or tool escaping expansion region in a boundary portion of each of adjacent regions being processed. Therefore, the invention has an effect of making a difference in level in conspicuous on a boundary portion between adjacent processed regions.

According to the invention describe in claim 3 above, the radius of tangential curved surfaces in the expansion regions is set larger than an amount of expansion of the tangential curved surfaces. Therefore, the invention has an effect of making the difference in level more inconspicuous.

What is claimed is:

1. A method of making a tool path, comprising the steps of:

designating processing regions on a surface to be processed;

designating reference lines on the processing regions;

calculating on the basis of the reference lines a plurality of tool paths on the processing regions;

selecting at least one of the adding of a tool approaching expansion region of which a distance measured from the surface to be processed becomes larger as the expansion region gets away from the processing region to a starting end in the picking direction of the processing region, and the adding of a tool escaping expansion region of which a distance measured from the surface to be processed becomes larger as this expansion region gets away from the processing region to a terminal end in the picking direction of the processing region; and calculating the tool path on the expanded region.

2. A method of making a tool path, comprising the steps of:

dividing a surface to be processed into parts and designating a plurality of processing regions;

designating reference lines on the processing regions;

calculating on the basis of the reference lines a plurality of tool paths on each of the processing regions;

adding a tool approaching expansion region of which a distance measured from the surface to be processed becomes larger as the expansion region gets away from the processing region to a starting end in the picking direction of a processing region which agrees with a boundary line of two adjacent processing regions;

adding a tool escaping expansion region of which a distance measured from the surface to be processed becomes larger as this expansion region gets away from the processing region to a terminal end in the picking direction of the processing region which agrees with a boundary line of two adjacent processing regions; and calculating tool paths on each expansion region.

3. A method of making a tool path according to claim 1, wherein the expansion regions are tangential curved surfaces contacting the surface to be processed, and including boundary lines between the expansion regions and the processing region, and the radius of the tangential curved surfaces being set not smaller than an expansion amount of the tangential curved surface.

4. A method of making a tool path according to claim 2, wherein the expansion regions are tangential curved surfaces contacting the surface to be processed, and including boundary lines between the expansion regions and the processing region and, and the radius of the tangential curved surfaces being set not smaller than an expansion amount of the tangential curved surface.

* * * * *